United States Patent [19]
Koyanagi et al.

[11] Patent Number: 5,803,376
[45] Date of Patent: Sep. 8, 1998

[54] CRUSHING MACHINE CONTROL SYSTEM FOR A SELF-TRAVELING CRUSHING MACHINE VEHICLE

[75] Inventors: Satoru Koyanagi; Katsuhiro Ikegami; Yukio Tamura; Toru Nakayama; Yuji Ozawa, all of Kawasaki, Japan

[73] Assignee: Komatsu Ltd., Tokyo, Japan

[21] Appl. No.: 776,203

[22] PCT Filed: Jul. 19, 1995

[86] PCT No.: PCT/JP95/01437

§ 371 Date: Dec. 31, 1996

§ 102(e) Date: Dec. 31, 1996

[87] PCT Pub. No.: WO96/02325

PCT Pub. Date: Feb. 1, 1996

[30] Foreign Application Priority Data

Jul. 20, 1994 [JP] Japan ................................. 6-167999

[51] Int. Cl.⁶ .................................................. B02C 25/00
[52] U.S. Cl. ........................................ 241/36; 241/101.74
[58] Field of Search ................................. 241/36, 101.74, 241/30; 60/449, 444, 441, 506

[56] References Cited

U.S. PATENT DOCUMENTS 5,052,630 10/1991 Hinsey et al. ............................. 241/36
5,248,100 9/1993 Arakawa ................................... 241/36
5,285,973 2/1994 Goforth et al. ............................. 241/36
5,580,004 12/1996 Tamura et al. ............................. 241/36

FOREIGN PATENT DOCUMENTS 61-167462 7/1986 Japan .
64-32744 3/1989 Japan .

*Primary Examiner*—Mark Rosenbaum
*Attorney, Agent, or Firm*—Frishauf, Holtz, Goodman, Langer & Chick

[57] ABSTRACT

A crushing machine control system for a self-traveling crushing machine vehicle having mounted thereon a crushing machine driven by a single variable capacity type hydraulic motor. The control system includes a load sensor for detecting an inlet pressure of the hydraulic motor which reflects a magnitude of a load acting on the crushing machine, and a capacity controller for increasing a capacity of the hydraulic motor when the detected inlet pressure is greater than a predetermined value and for decreasing the capacity of the hydraulic motor when the detected inlet pressure is smaller than the predetermined value.

6 Claims, 6 Drawing Sheets

CRUSHING MACHINE CONTROL SYSTEM FOR A SELF-TRAVELING CRUSHING MACHINE VEHICLE

TECHNICAL FIELD

The present invention relates to a crushing machine control system for a self-traveling crushing machine vehicle that is designed for crushing building scraps at a building destruction site.

BACKGROUND ART

As disclosed in Japanese Unexamined Utility Model Publication No. Sho 64-32744, there has been known a self-traveling crushing machine vehicle in which a crushing machine, a hopper coupled to the said crushing machine and a drive unit for driving the said crushing machine are mounted on a vehicle body that is equipped with a pair of left hand side and right hand side self-traveling bodies and in which a discharge conveyer is mounted, so as to be capable of rising up and falling down, between the left hand side and right hand side self-traveling bodies in the pair on the lower part of the said vehicle body.

Such a self-travelling type crushing machine vehicle is capable of being driven by itself. In addition, it is capable of finely crushing a mass of crushable objects which are constituted by building scraps or the like which are charged into the hopper, and then discharging the crushed pieces out of the vehicle body by means of the discharge conveyer.

A crushing machine that is mounted on such a self-travelling crushing machine vehicle has a drive source which is constituted by a hydraulic motor that is rotated with a pressurized discharge fluid from a hydraulic pump. The said hydraulic motor has the rate of rotation that is determined by the rate of flow of the pressurized supply fluid and an output torque thereof is determined by the pressure of the said pressurized supply fluid. Accordingly, the rate of rotation of the crushing machine and the crushing force thereof are determined by the rate of flow and the pressure of the said pressurized supply fluid. And, since the output of the drive source of the hydraulic pump is normally set to be constant, there are mutually contradictory relationships between the rate of flow and the pressure of the hydraulic pump.

More specifically, when the rate of flow of the supply fluid from the hydraulic pump is greater, the pressure of the supply fluid will be reduced whereas when the rate of flow of the supply fluid from the hydraulic pump is smaller, the pressure of the supply fluid will be increased. Hence, when the rate of rotation of the crushing machine is a higher speed, the crushing force will be reduced and when the crushing force of the crushing machine is greater, the rate of rotation thereof will be a lower speed.

For this reason, a problem arises with a crushing machine in the prior art in that when the crushing force thereof is made greater in order to render the crushing machine applicable to a crushable object that is hard to be crushed such as a tire, the rate of rotation thereof will be made so slow that there may be a lowering of performance in crushing a crushable object that is easy to be crushed such as a wood piece, and when on the contrary the rate of rotation thereof is increased to crush with an increased performance a crushable object that is easy to be crushed such as a wood piece, the crushing force thereof will be so reduced that the crushing machine may be incapable of crushing a crushable object that is hard to be crushed such as a tire.

Accordingly, it is an object of the present invention to provide a crushing machine control system for a self-traveling crushing machine vehicle having a crushing machine which can be driven so as to provide an increased crushing force when a load relative to the crushing machine is greater and which can be driven at an increased speed when the said load is smaller, and hence is rendered to appropriately meet with either of the cases.

SUMMARY OF THE INVENTION

In order to achieve the object mentioned above, there is provided in accordance with the present invention, in one aspect thereof, a crushing machine control system for a self-traveling crushing machine vehicle in which a vehicle body that is equipped with a self-traveling mechanism has mounted thereon a crushing machine which is driven by a hydraulic motor, characterized in that:

the said hydraulic motor is constituted by a variable capacity type hydraulic motor; and there are provided a load sensing means for detecting the magnitude of a load that acts on the said crushing machine, and a capacity control means that is designed to increase the capacity of the said hydraulic motor when a detected load is greater and to decrease the capacity of the said hydraulic motor when the detected load is smaller.

According to the construction mentioned above, the hydraulic motor can be driven in a controlled manner at a low speed, a large torque, a high speed and a small torque as desired, by changing the magnitude of the capacity (i.e. the rate of flow necessary for a single rotation) of the hydraulic motor depending upon the magnitude of the load of the crushing machine. Accordingly, it can be seen that the hydraulic motor is capable of being driven to provide an increased crushing force when a greater load acts on the crushing machine and is capable of being driven at an increased speed when a smaller load acts on the crushing machine, and hence is rendered to appropriately meet with either of the cases.

It should be noted here that in the construction mentioned above, it is preferred that the said load sensing means should comprise a pressure sensing means for detecting an inlet pressure of the said hydraulic motor, and that the said capacity control means should be so configured that when the detected inlet pressure is a lower pressure, the said hydraulic motor may have a smaller capacity and when the detected inlet pressure is a higher pressure, the said hydraulic motor may have a greater capacity.

It is also preferable that in the construction mentioned above, the said load sensing means should comprise a rate of rotation sensing means for detecting a rate of rotation of the said hydraulic motor, and that the said capacity control means should be so configured that when the detected rate of rotation is a higher speed, the said hydraulic motor may have a smaller capacity and when the detected rate of rotation is a lower speed, the said hydraulic motor may have a greater capacity.

It is further desirable that the said system should be additionally provided with an excessive load sensing means for detecting an excessive load that acts on the said crushing machine; and that it should be so configured that when an excessive load is detected, the said hydraulic motor may be reversely driven.

BRIEF EXPLANATION OF THE DRAWINGS

The present invention will better be understood from the following detailed description and the drawings attached hereto showing a certain illustrative embodiment of the present invention. In this connection, it should be noted that such a embodiment as illustrated in the accompanying drawings is intended in no way to limit the present invention, but to facilitate an explanation and understanding thereof.

In the accompanying drawings.

BEST MODES FOR CARRYING OUT THE INVENTION

Hereinafter, a suitable embodiment of the present invention with respect to a crushing machine control system for a self-traveling crushing machine vehicle will be set forth with reference to the accompanying drawings hereof.

Figure 1:
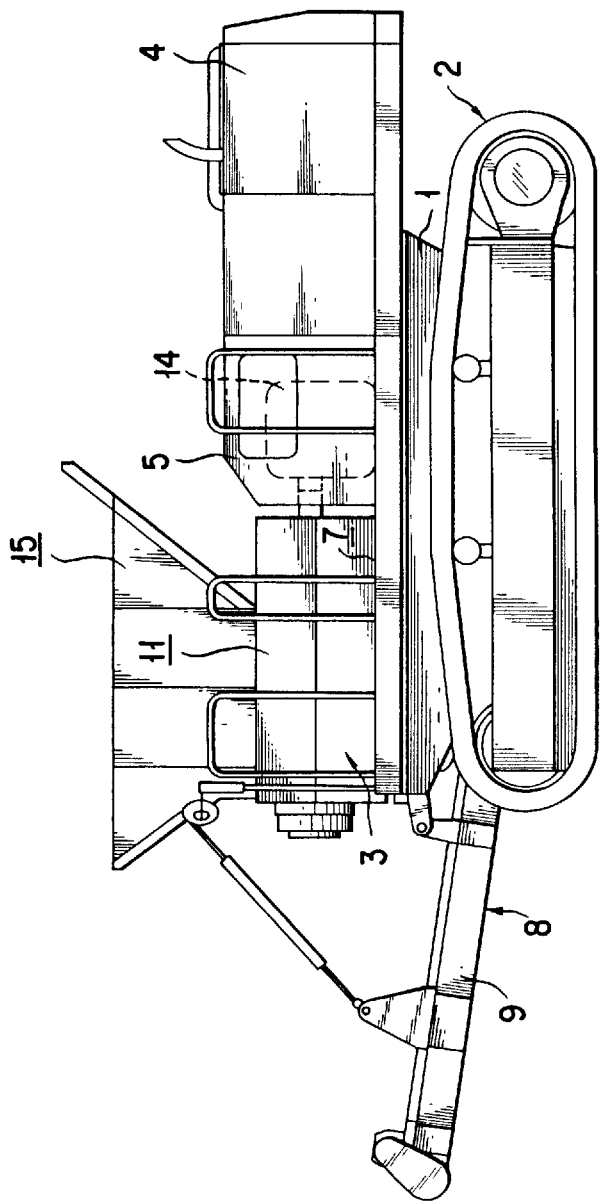
FIG. 1 is a front view illustrating a self-traveling crushing machine vehicle that incorporates a certain embodiment of the crushing machine control system according to the present invention.
Figure 2:
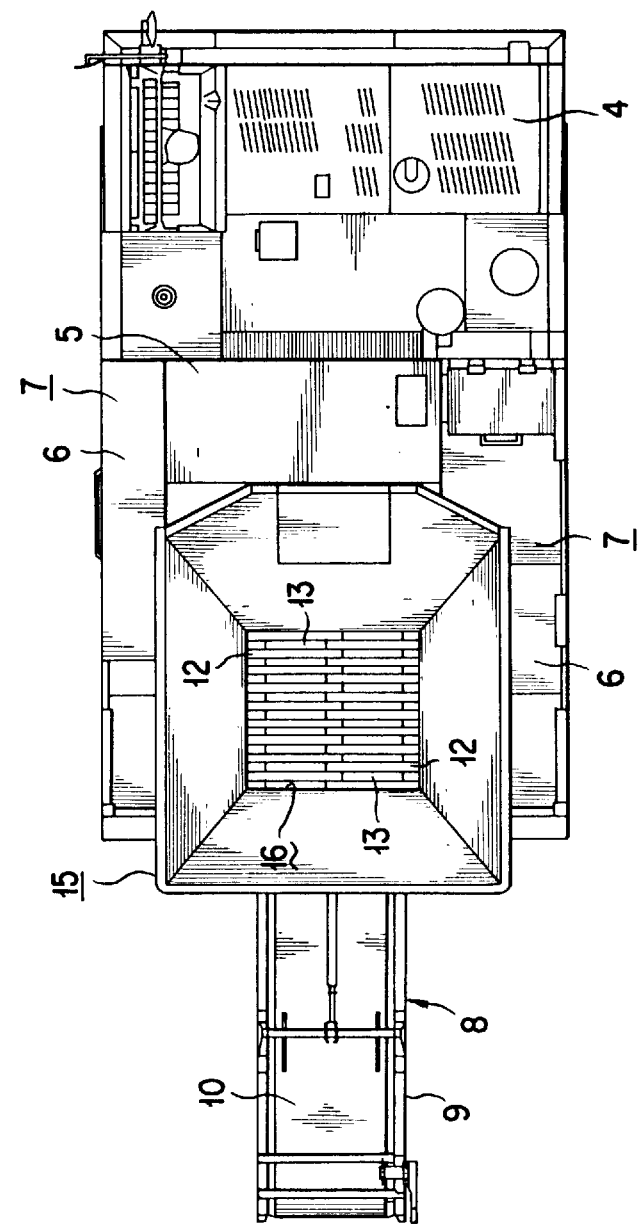
FIG. 2 is a top plan view illustrating the above mentioned self-traveling crushing machine vehicle of the present invention.

As shown in FIGS. 1 and 2, a vehicle body 1 has, at its right hand side and left hand side, a pair of right hand side and left hand side traveling bodies 2 appended thereto, respectively. A crushing machine 3 is mounted on the said vehicle body 1 at a site that is closer to one end in the forward and rearward direction thereof. Also, a cover 4 is mounted on the above mentioned vehicle body 1 at a site that is closer to the other end in the forward and rearward direction thereof, and a auxiliary cover 5 is mounted on the said vehicle body 1 at a central region in the forward and rearward direction thereof. Across the said auxiliary cover 5 and the said crushing machine 3 there lie a pair of step plates 6 at their right hand side and left hand side, respectively, and there also lie a pair of passages 7 at their right hand side and left hand side, respectively. Below the above mentioned vehicle body 1 there is provided a belt conveyer 8 between the said right hand side and left hand side traveling bodies 2 and 2 in the pair. The said belt conveyer 8 has a frame 9 with an endless belt 10 that is wound on a pair of pulleys (not shown) provided at the front and rear ends, respectively, and the said frame 9 is mounted to the lower part of the said vehicle body 1 so as to be capable of rising up and falling down.

The above mentioned crushing machine 3 has a multitude of cutters 12 within a housing 11 and a pair of rotary shafts 13, each of which extends in a forward and rearward direction in a horizontal plane and is supported so as to be rotatable. The said pair of rotary shafts 13 are adapted to be rotationally driven by a hydraulic motor 14, and it is a hopper 15 that is mounted on the upper part of the said housing 11. Crushable objects which are cast into the said hopper 15 are then charged through a charging inlet 16 at the upper part part of the said housing 11 into the latter and, with the said pair of rotary shafts 13 rotated, are allowed to be crushed to yield crushed pieces. The crushed pieces are discharged through a discharge outlet formed in the bottom of the said housing 11 and are then allowed to drop onto the above mentioned belt conveyer 8.

Now, an explanation will be given with respect to a hydraulic circuit in the present embodiment of the crushing machine control system according to the instant invention.

Figure 3:
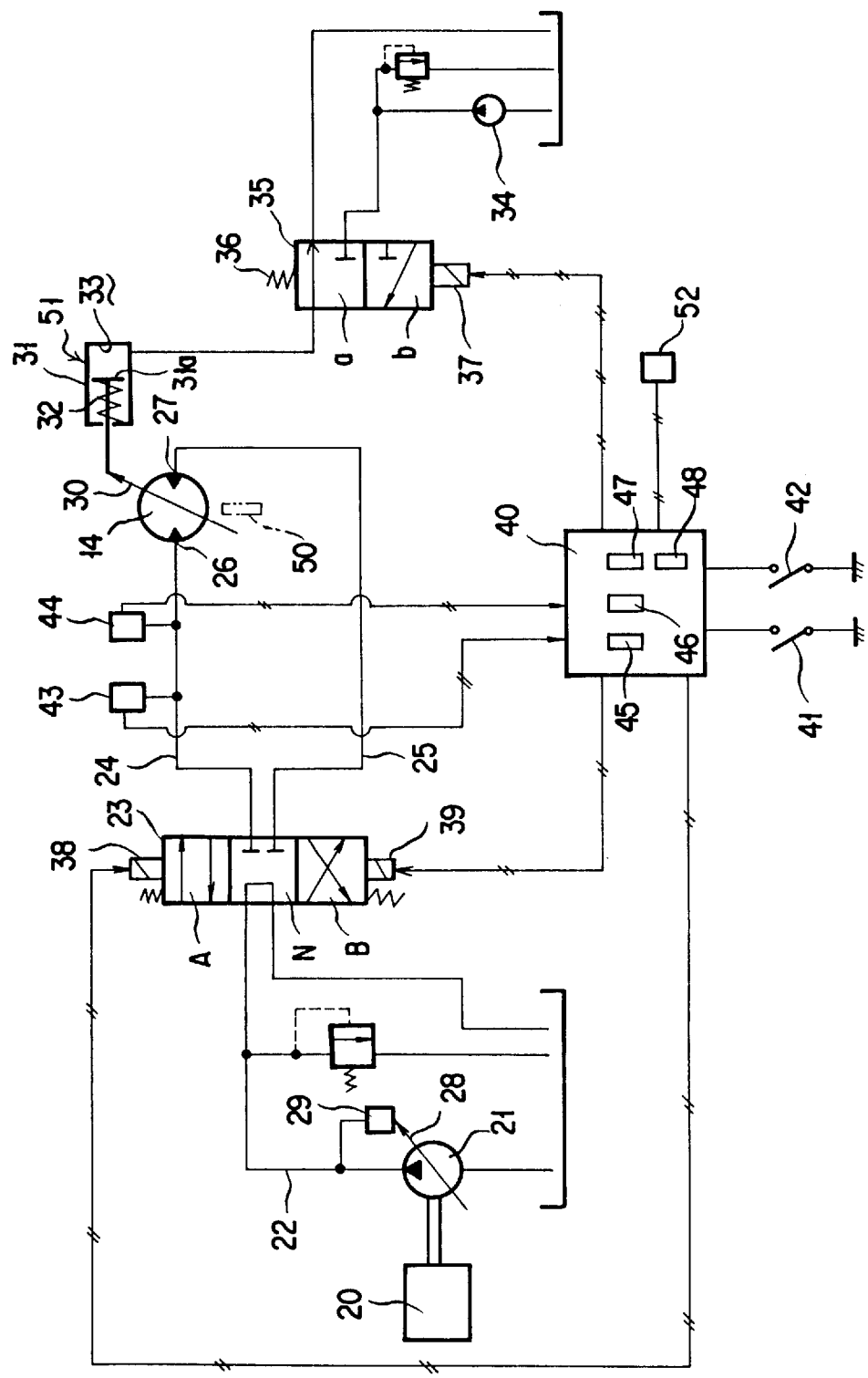
FIG. 3 is a circuit diagram illustrating a hydraulic circuit for use in the above mentioned embodiment of the present invention.

As shown in FIG. 3, a hydraulic pump 21 that is driven by an engine 20 has a discharge path 22 which is connected to one of a first main circuit 24 and a second main circuit 25 through a directional control valve 23. The said first main circuit 24 is connected to a positive rotary port 26 whereas the said second main circuit 25 is connected to a reverse rotary port 27. Then, when the said directional control valve 23 is switched from its neutral position N to its positive rotary position A, a pressure fluid will be supplied into the said first main circuit 24 to rotate the said hydraulic motor 14 in its positive direction. And, when the said directional control valve 23 is switched to its reverse rotary position B, the pressure fluid will be fed to the said second main circuit 25 to rotate the said hydraulic motor 14 in its reverse direction.

The above mentioned hydraulic pump 21 is of a variable capacity type of which the capacity (i. e. the rate of flow of the discharge fluid for a single rotation) is changed by changing the angle of inclination of a swash plate 28. The said angle of inclination of the swash plate 28 is altered by a pump discharge pressure of the fluid that is fed into a capacity control member 29 which is here constituted by a servo cylinder or the like. As a result, the capacity of the said hydraulic pump 21 is controlled so as to maintain the product of the discharge pressure and the rate of flow of the discharge fluid for a rotation, that is, the horse power of absorption substantially constant.

The above mentioned hydraulic motor 14 is of a variable capacity type of which the capacity (i. e. the rate of flow that is necessary for a single rotation) is controlled by changing the angle of inclination of a swash plate 30. The said angle of inclination of the swash plate 30 is controlled by a capacity control member 51 that comprised, for example, of a cylinder 31, a piston 31a and a spring 32. Specifically, the said piston 31a that is connected to the said swash plate 30, is energized in a direction in which the said angle of inclination is increased, and is operated in a direction in which the said angle of inclination is decreased when a pressure receiving chamber 33 within the said cylinder 31 is supplied with the pressure fluid.

The above mentioned pressure receiving chamber 33 of the cylinder 31 is supplied via a switching valve 35 with a discharge pressure fluid from a hydraulic control pump 34.

The said switching valve 35 is allowed to take its drain position a by a spring 36 and, when a solenoid 37 with an electrical current passed therethrough is magnetically energized, is allowed to take its supply position b.

The above mentioned directional control valve 23 is normally held at its neutral position and, when a first solenoid 38 with an electric current passed therethrough is magnetically energized, is allowed to take its positive rotary position A. And, when a second solenoid 39 with an electric current passed therethrough is magnetically energized, the said directional control valve 23 is allowed to take its reverse rotary position B. The said first and second solenoids 38 and 39 and the said solenoid 37 are controlled by being supplied with an electric current by a controller 40.

The above mentioned controller 40 is furnished at a first input thereof with an automatic signal that is fed from an automatic switch 41, at a second input thereof with a stop signal that is fed from a stop switch 42, at a third input thereof with a high pressure signal that is fed from a high pressure switch 43 and at a fourth input thereof with a low pressure signal that is fed from a low pressure switch 44, the said high pressure and low pressure switches 43 and 44 being provided in the above mentioned first main circuit 24. For example, when the pressure in the said first main circuit 24 reaches a second established pressure $P_2$ (e. g. 315 kg/cm$^2$), the said high pressure switch 43 will be turned ON. Also, when the pressure in the said first main circuit 24 reaches a first established pressure $P_1$ (e. g. 105 kg/cm$^2$), the said low pressure switch 44 will be turned ON.

Figure 4:
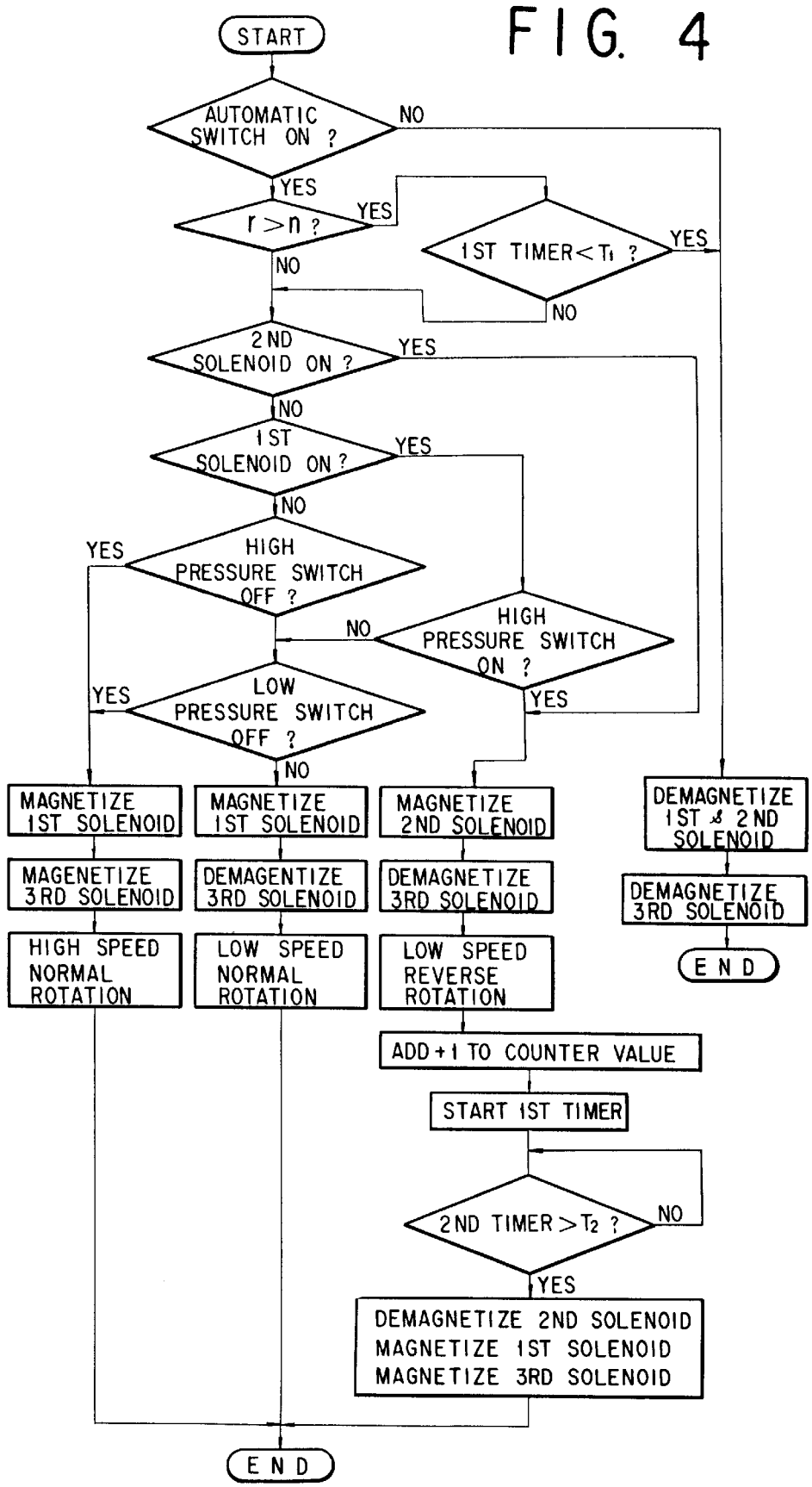
FIG. 4 is an operating flow chart of the above mentioned embodiment of the present invention.

Next, an explanation will be given with respect to the operation of the above mentioned crushing machine control system with reference to the flow chart that is shown in FIG. 4.

In the said flow chart, it should be noted here that $T_1$ and $T_2$ represent preliminarily established time periods, n represents a preliminarily established number of reverse rotation and r represents a number of reverse rotation that is counted by a counter 45.

With the said automatic switch 41 turned OFF and when the automatic signal is not furnished to the said controller 40, the latter will not permit an electric current to pass through the said third solenoid 37 and the said first and second solenoids 38 and 39, thereby switching the said valve 35 to take its drain position a and switching the said directional control valve 23 to take its neutral position N. This will cause the discharge pressure fluid from the said hydraulic pump 21 to flow out into a reservoir, will increase the angle of inclination of the said swash plate 30 for the said hydraulic motor 14 and will halt the said hydraulic motor 14. Thus, the said crushing machine will remain halted.

Here, when the said automatic switch 41 is turned ON to furnish the said controller 40 with the automatic signal, the controller 40 will judge when the number of reverse rotation r falls within the preliminarily established number of reverse rotation n in a predetermined period of time. If it does fall, the said first solenoid 38 will have an electric current passed therethrough to switch the said directional control valve 23 to take its positive rotary position A, thereby permitting the discharge pressure fluid from the said hydraulic pump 21 to be supplied through the said first main circuit 24 into the positive rotary port 26 of the said hydraulic motor 26 to rotate the latter in its positive direction, and the said third solenoid 37 of the switching valve 35 will have an electric current passed therethrough to switch the said valve 35 to take its supply position b, thereby reducing the angle of inclination of the said swash plate 30 for the said hydraulic motor 14.

The said hydraulic motor 14 will have the rate of flow reduced that is necessary for it to make a single rotation. The hydraulic motor 14 will then have a reduced output shaft torque at an increased speed as shown by the curves C and D in the graphs of FIG. 5. Accordingly, since the said crushing machine 3 can then rotate at an increased speed with a reduced torque, it will be capable of crushing with an increased efficiency such objects which are relatively easily crushable.

Then, the said low pressure switch 44 will remain ON. More specifically, the said low pressure switch 44 will remain so since the pressure in the said first main circuit 24 is in excess of the said first preliminarily established pressure $P_1$ (e. g. 150 kg/cm$^2$).

Next, when the load on the said crushing machine 3 is so large that the pressure in the said main circuit 24 may reach the said second preliminarily established pressure $P_2$ (e. g. 315 kg/cm$^2$), it can be seen that the said high pressure switch 43 will be turned ON. Since the said controller 40 thereby causes no electric current to pass through the said third solenoid 37 of the switching valve 35, the said switching valve 35 will then be switched to take its drain position a, thereby increasing the angle of inclination of the said smash plate 30 for the said hydraulic motor 14.

Figure 5:
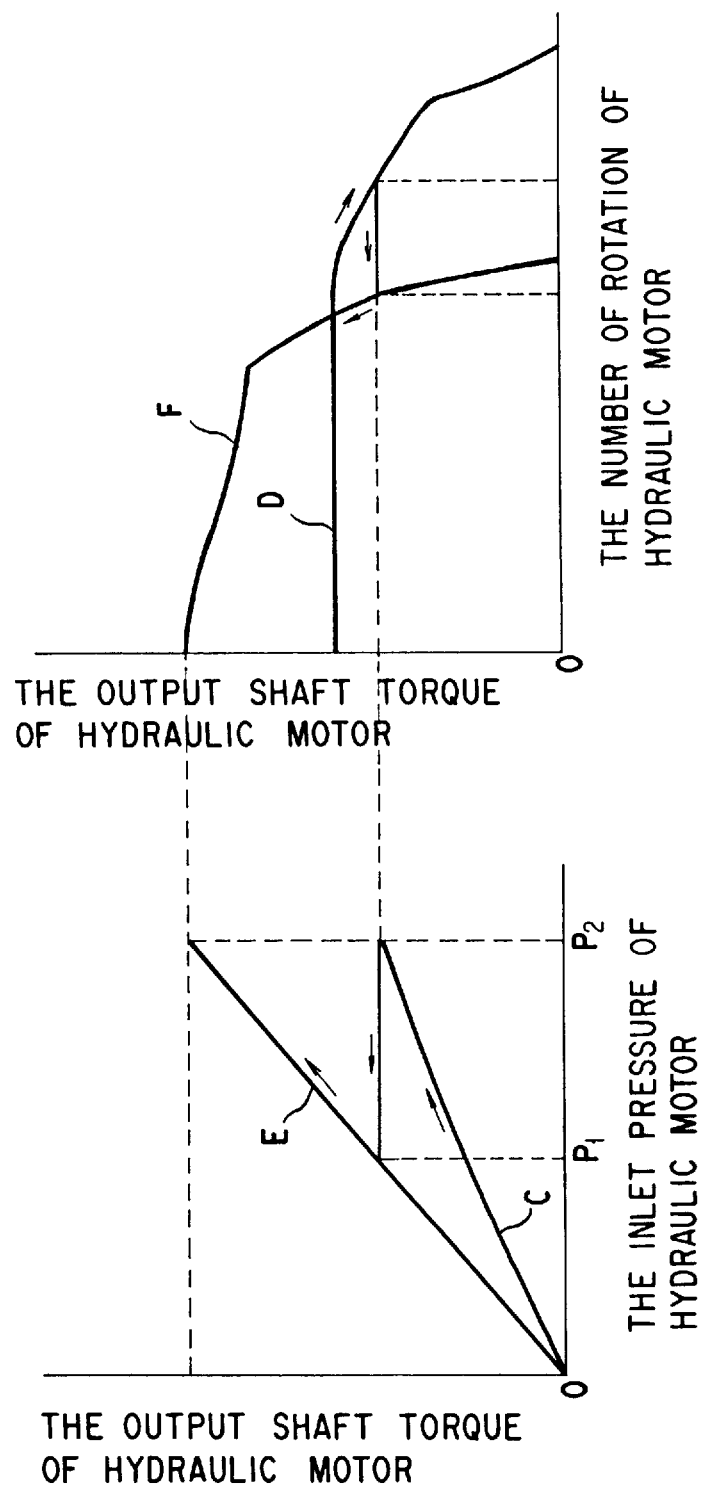
FIG. 5 is a graph showing the relationship of the output shaft torque of a hydraulic motor with the inlet pressure of the hydraulic motor and with the rate of rotation of the hydraulic motor where if the crushing machine is to be controlledly driven by the above mentioned embodiment of the present invention, the pressure of the hydraulic motor that develops when it is switched from a high speed operation to a low speed operation is made identical to the pressure of the hydraulic motor that develops when it is switched from a low speed operation to a high speed operation.

Since the said hydraulic motor 14 has the rate of flow increased that is necessary for it to make a single rotation, it will be rotated at a reduced speed with an increased torque as shown by the curves E and F in the graphs of FIG. 5. Accordingly, since the said crushing machine 3 can then rotate at a reduced speed with an increased torque, it will be capable of crushing such objects which are hard to be crushed.

The pressure in the said first main circuit 24 will then be made lower than the said second preliminarily set pressure $P_2$.

Next, when the load on the said crushing machine 3 is reduced so that the pressure in the said first main circuit 24 may be made lower than the said first preliminarily set pressure P1 and when the said low pressure switch 44 is turned OFF, the controller 40 will allow an electric current to pass through the said third solenoid 37 of the switching valve 35 to switch the said valve 35 to take its supply position b, thereby supplying the discharge pressure fluid of the said hydraulic control pump 34 into the said pressure receiving chamber 33 of the cylinder 31 to reduce the angle of inclination of the swash plate 30 for the said hydraulic motor 14.

The said hydraulic motor 14 will thereby be rotated at an increased speed with a reduced output shaft torque. The said crushing machine 3 will thus be rotated at an increased speed with a reduced torque.

Also, where the above mentioned hydraulic motor 14 is rotated at a low speed with an increased output shaft torque, when the load on the said crushing machine 3 is further increased so that the pressure in the said first main circuit 24 may be in excess of the said preliminarily established pressure $P_2$, the said high pressure switch 43 will be turned ON. Then, with the said controller 40 thereby judging that an excessive pressure is exerted on the said crushing machine 3, the said first solenoid 38 will be demagnetized and concurrently the said second solenoid 39 will be allowed to have an electric current passed therethrough to switch the said directional control valve 23 to take its reverse rotary position B.

Since the discharge pressure fluid of the said hydraulic pump 21 is thereby supplied via the said second main circuit 25 into the said reverse rotary port 27, it follows that the said hydraulic motor 14 will be rotated at a low speed with an increased output shaft torque. The said crushing machine 3 will thus be rotated at a reduced speed with an increased torque.

Concurrently with the above, the said controller 40 will cause to add a value of +1 as the number of reverse rotation to the said counter 45 and will allow a first timer 46 and a second timer 47 to start their timing operations, clearing the said second timer 47 after it times out a predetermined period of time $T_2$. Thereafter, the said controller 40 will allow an electric current to pass through the said first solenoid 38 and the said third solenoid 37, thereby switching the said directional control valve 23 to take its positive rotary position A to rotate the said hydraulic motor 14 in its positive direction at an increased speed as mentioned previously.

More specifically, when the said high pressure switch 43 is turned ON when the said hydraulic motor 14 is rotated at a reduced speed with an increased torque, it follows that the said hydraulic motor 14 will be so rotated by a preset time period and will thereafter be rotated at an increased speed in its positive direction while counting the number of reverse rotation.

When the value r of the said counter 45 which has counted in this manner reaches, within the said preliminarily established period of time $T_1$, a value in excess of the said preliminarily set number of rotation n which has been established in a setting unit 48, the said first and second solenoids 38 and 39 and the said third solenoid 37 will be demagnetized, the said directional control valve 23 will be switched to its neutral position N, and the said switching valve 35 will be switched to its drain position a to stop the rotation of the said hydraulic motor 14.

More specifically, the fact that the said hydraulic motor 14 is reversely rotated a number of times in a preset time interval, means the presence of any abnormality whatsoever. In that case, the said hydraulic motor 14 should be stopped and its components should be checked by the operator.

Figure 6:
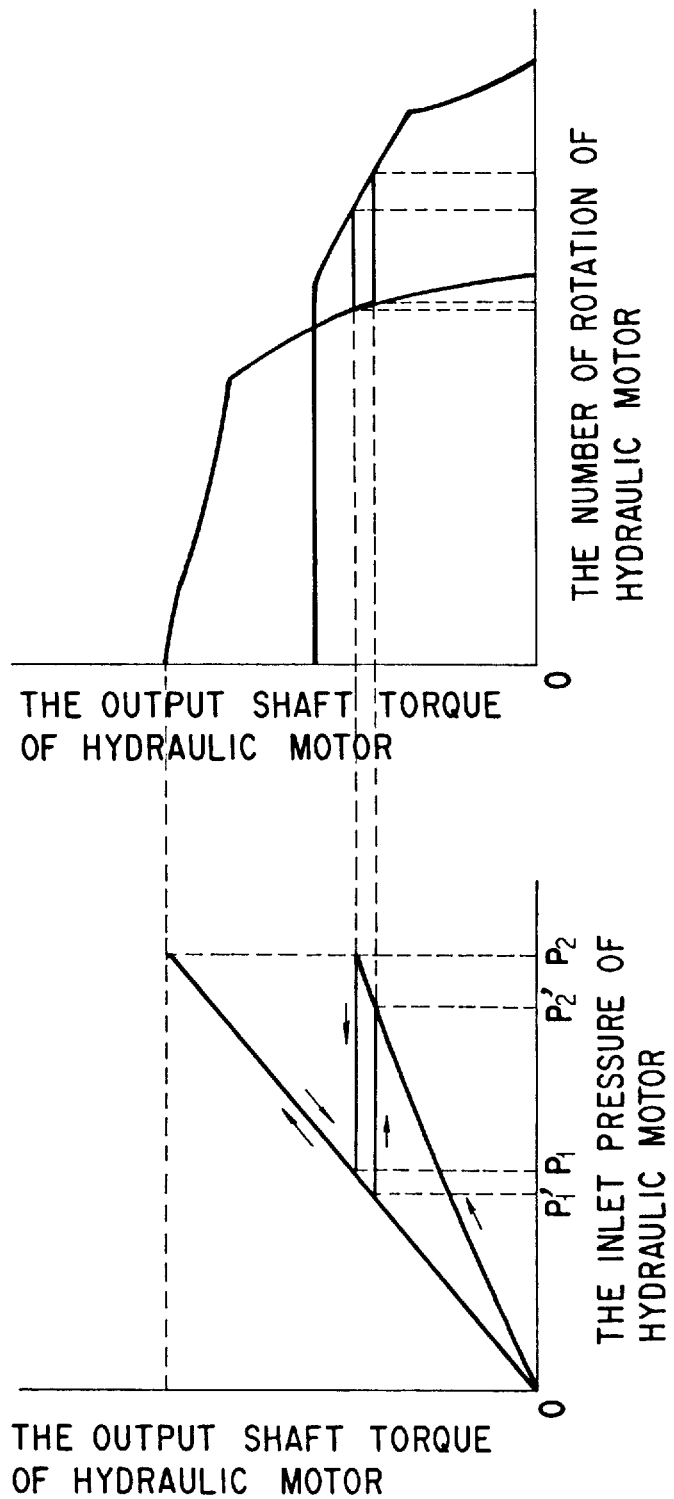
FIG. 6 a graph showing the relationship of the output shaft torque of a hydraulic motor with the inlet pressure of the hydraulic motor and with the rate of rotation of the hydraulic motor where if the crushing machine is to be controlledly driven by the above mentioned embodiment of the present invention, the pressure of the hydraulic motor that develops when it is switched from a low speed operation to a high speed operation is made lower than the pressure of the hydraulic motor that develops when it is switched from a high speed operation to a low speed operation.

While in the foregoing embodiment of the present invention, the pressure that develops when the said hydraulic motor 14 is switched from a high speed operation to a low speed operation, as shown in FIG. 5, is made identical to the pressure that develops when it is switched from a low speed operation to a high speed operation, it should be noted that a setting can also be made in which the pressures $P_1'$ and $P_2'$ that develop when it is switched from a low speed operation to a high speed operation, as shown in FIG. 6, are made slightly lower than the pressures $P_1$ and $P_2$ that develop when it is switched from a high speed operation to a low speed operation. By so doing, a switching can be so made between a high speed operation and a low speed operation within a range of that pressure difference that there may not develop a hunching.

Also, while in the foregoing embodiment of the present invention, a switching is made between a high speed operation and a low speed operation according to the pressure at the inlet side of the said hydraulic motor 14, it should be noted that an alternative switching may be made between a high speed operation and a low speed operation according to the number of rotation of the said hydraulic motor.

For example, as shown by the phantom line in FIG. 3, there may be provided a rotation sensor 50 that is designed to detect the rate of rotation of the said hydraulic motor 14. The said controller 40 will then be set so as to establish both a high rate of rotation and a low rate of rotation of the said hydraulic motor. Then, when the rate of rotation of the said hydraulic motor 14 reaches the said established low rate of rotation, the said third solenoid 37 will be demagnetized to increase the angle of inclination of the said swash plate 30, thereby switching to a low speed operation of the said hydraulic motor. In this state, when the rate of rotation of the said hydraulic motor 14 reaches the said established high rate of rotation, an electric current will be passed through the said third solenoid 37 to reduce the angle of inclination of the said swash plate 30, thereby switching to a high speed operation of the said hydraulic motor. Furthermore, in the above mentioned low speed state of the said hydraulic motor 14, when the load on the said crushing machine 3 is made excessive, as in the previous case the system can also be so configured that an electric current may be passed through the said second solenoid 39 to cause the said hydraulic motor 14 to be reversely rotated at a low speed.

Stated otherwise, there may be provided a means for detecting the magnitude of the load that acts on the said crushing machine 3. Then, the system may be configured so that when the said load is small, the said hydraulic motor 14 may have a reduced capacity and when the said load is large, the said hydraulic motor 14 may have an increased capacity; and in the case of an excessive load, the said hydraulic motor 14 may be reversely rotated.

As set forth in the foregoing description, the present embodiment of the invention is adapted to change the capacity of the hydraulic motor 14, thereby controlling the said hydraulic motor to run at a low speed, with a large torque, at a high speed and with a small torque, depending on the magnitude of a load that acts on the crushing machine 3. Accordingly, the said crushing machine can be driven with an increased crushing force when the load acting thereon is large, and can be driven at an increased speed when the said load is reduced. Thus, it can appropriately meet with either of the cases.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A self-traveling crushing machine vehicle having mounted thereon a crushing machine driven by a single variable capacity type hydraulic motor, said self-travelling crushing machine vehicle including a control system comprising:

a load sensor for detecting an inlet pressure of said hydraulic motor, said inlet pressure reflecting a magnitude of a load acting on said crushing machine; and a capacity controller for increasing a capacity of said hydraulic motor when the detected inlet pressure is greater than a predetermined value and for decreasing the capacity of said hydraulic motor when the detected inlet pressure is smaller than the predetermined value.

2. The self-traveling crushing machine vehicle according to claim 1, wherein said control system further comprises a rate of rotation sensor for detecting a rate of rotation of said hydraulic motor, and wherein said capacity controller decreases the capacity of said hydraulic motor when the detected rate of rotation is higher than a predetermined speed and increases the capacity of said hydraulic motor when the detected rate of rotation is less than the predetermined speed.

3. The self-traveling crushing machine vehicle according to claim 2, wherein said control system further comprises an excessive load sensor for detecting an excessive load acting on said crushing machine, and a driving controller for reversely driving said hydraulic motor responsive to detection of the excessive load.

4. The self-traveling crushing machine vehicle according to claim 1, wherein said control system further comprises an excessive load sensor for detecting an excessive load acting on said crushing machine, and a driving controller for reversely driving said hydraulic motor responsive to detection of the excessive load.

5. The self-traveling crushing machine vehicle according to claim 1, wherein said capacity controller comprises an inclination angle controller for controlling an inclination angle of said hydraulic motor in accordance with the inlet pressure detected by said load sensor.

6. The self-traveling crushing machine vehicle according to claim 5, wherein said inclination angle controller comprises a cylinder with a piston provided therein, said piston being coupled with said hydraulic motor for changing the inclination angle of said hydraulic motor in accordance with the inlet pressure detected by said load sensor.

* * * * *